United States Patent Office.

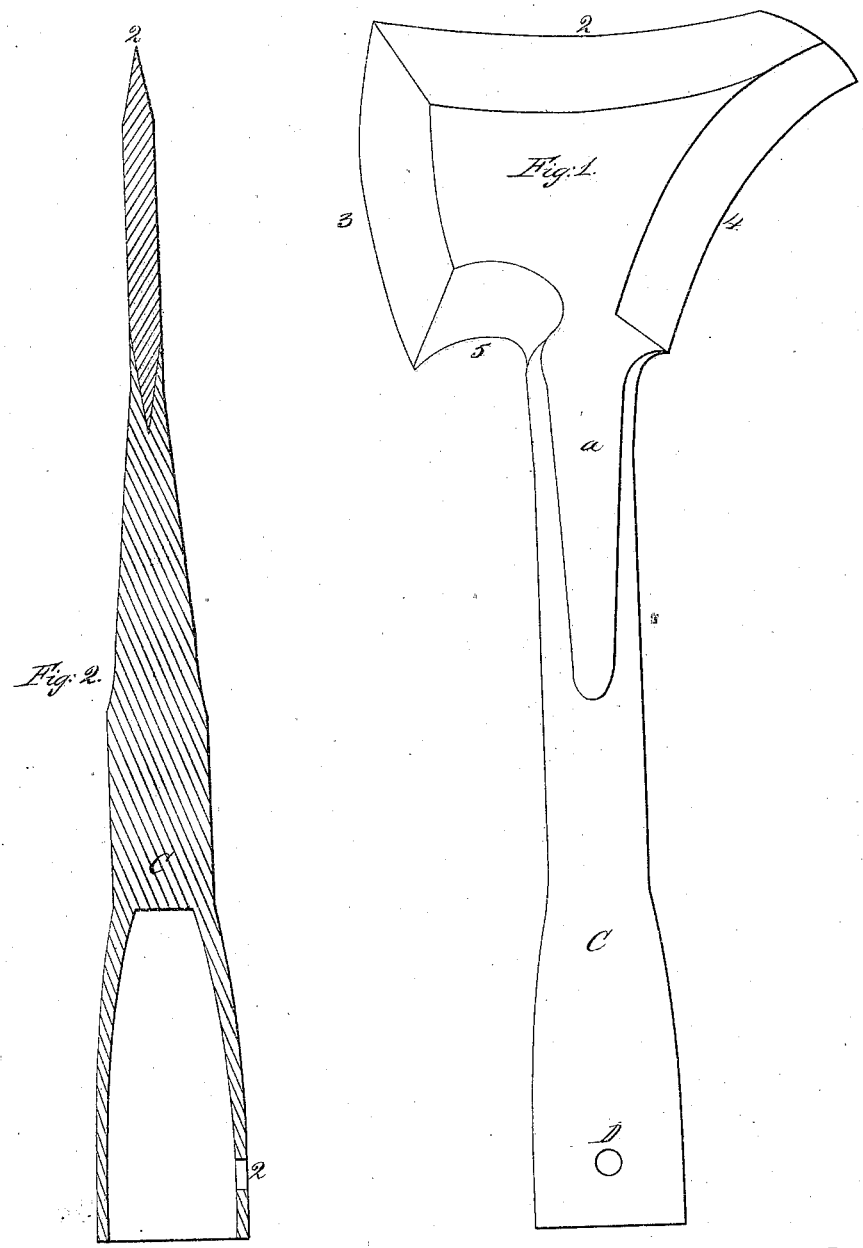

JERISON WHITE, OF PROVIDENCE, PENNSYLVANIA.

Letters Patent No. 111,024, dated January 17, 1871.

IMPROVEMENT IN PRUNING HATCHETS.

The Schedule referred to in these Letters Patent and making part of the same.

*To all whom it may concern:*

Be it known that I, JERISON WHITE, of Providence, in the county of Luzerne and in the State of Pennsylvania, have invented certain new and useful Improvements in Pruning-Hatchet; and do hereby declare that the following is a full and exact description thereof, reference being had to the accompanying drawing and to the letters of reference marked thereon making a part of this specification.

Specification.

My invention relates to the construction of a pruning-hatchet, consisting of the concaved edges 2, 4, and 5, with the convex edge 3, and the shank and socket C, constructed as described.

My invention consists—

First, of a concaved edge, 2, designed to be slid along a limb for the purpose of reaching the desired point of operation.

Second, the "pruning-knife" edge 4, so constructed as to be used in the hand for trimming small branches.

Third, the "hook-edge" 5, used for cutting small limbs by drawing the tool toward the operator.

Fourth, the convex or "hatchet"-edge 3, to be used as a hatchet as the occasion may require.

Fifth, the shank and socket C, furnished with a thumb-screw, D, by which the tool may be readily fastened or detached from the handle on which it is used.

Description of Accompanying Drawing.

Figure 1 is a side view, showing edges 2, 3, 4, and 5.

Figure 2 is a longitudinal cross-section on line with the center of handle and shank.

C, socket in which the handle is inserted.

D, hole to receive thumb-screw.

Claim.

I claim as my invention—

The construction of a "pruning-hatchet," consisting of the concaved edges 2, 4, and 5, with the convex edge 3, and the shank and socket C, constructed as described.

Witnesses:              JERISON WHITE.
  E. H. WHITE,
  CHAS. BABCOCK.